Patented Mar. 4, 1952

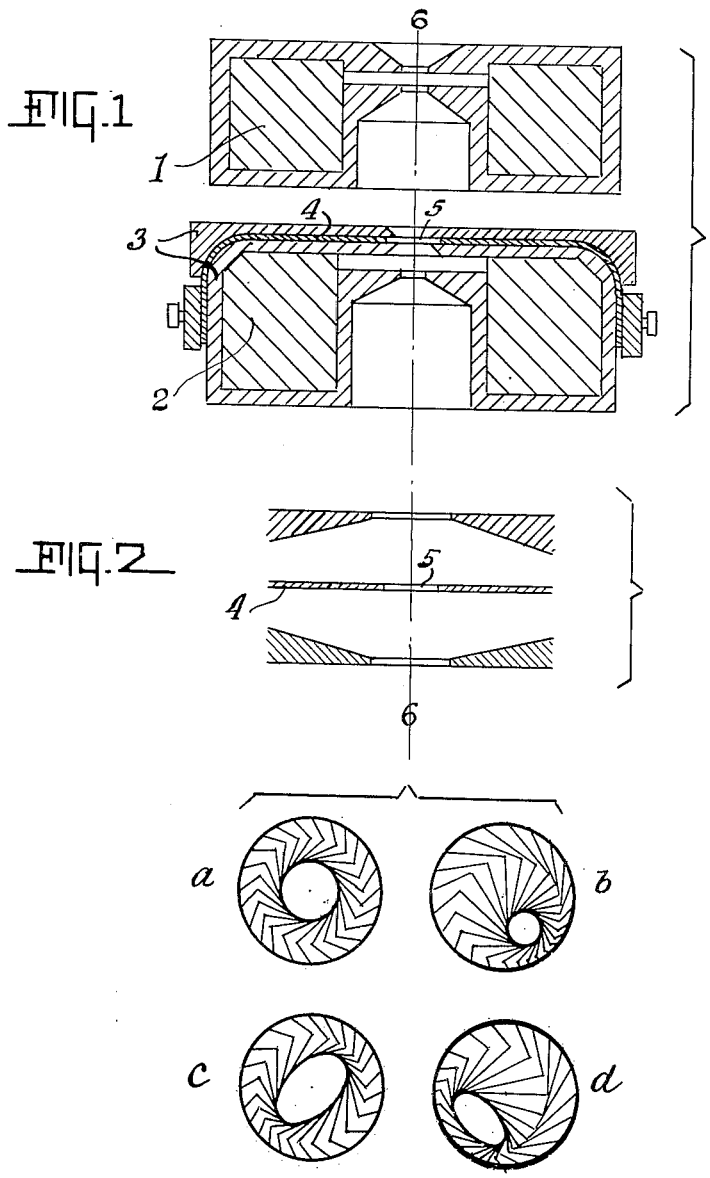

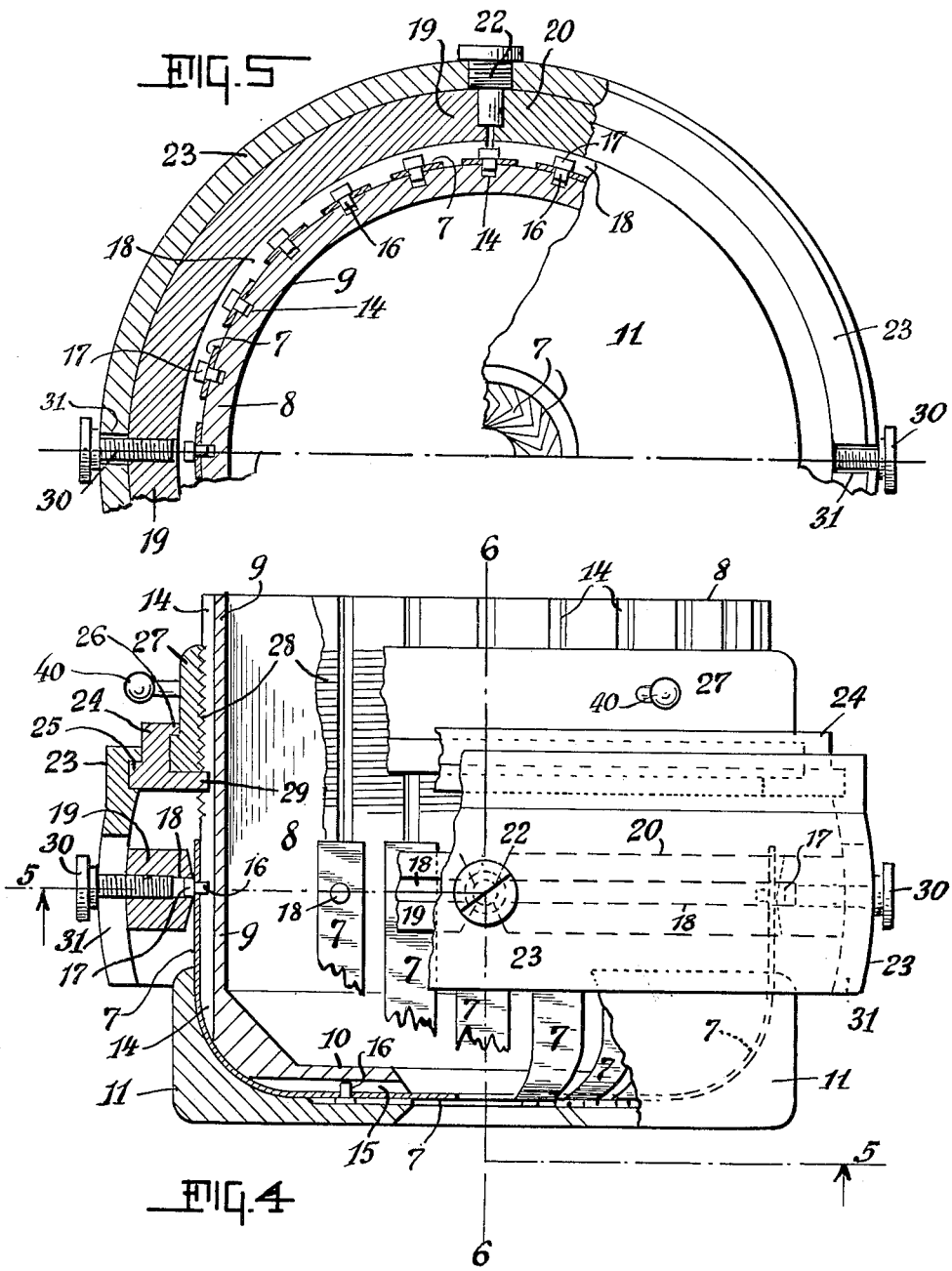

2,587,942

UNITED STATES PATENT OFFICE 2,587,942

ELECTRONIC OPTICAL CORRECTION MECH-
ANISM FOR MAGNETIC LENSES

Gustav Weissenberg, Marburg/Lahn, and Otto
Sänger, Wetzlar/Lahn, Germany, assignors to
Ernst Leitz, G. m. b. H., Wetzlar, Germany, a
corporation of Germany Application October 20, 1950, Serial No. 191,216
In Germany December 27, 1949

7 Claims. (Cl. 313—84)

The object of this invention is to provide an electronic optical correction mechanism for magnetic lenses, particularly used in electronic microscopes and includes permanent as well as electromagnetic lenses. Electronic lenses may be corrected for astigmatism by placing electronic cylinder lenses in the path of the electron beam. This invention has for one of its objects to provide a particularly advantageous and easily adjusted form of such cylinder lenses by mounting an iris diaphragm of ferromagnetic material in the path of the electron beam in an electronic microscope, the diaphragm being so arranged that the opening may be changed from circular to elliptical and the change of the diaphragm opening may be symmetrical or non-symmetrical with respect to the optical axis.

By varying the form, size and location of the opening in the iris diaphragm with respect to the optical axis of the microscope and the axis of the electronic-optical system, the magnetic field may be changed to whatever degree may be necessary or desirable. It is not critical that the iris diaphragm be located in the symmetrical plane of the gap between the magnetic poles. It may be placed otherwise in the path of the electron beam of an electronic microscope. The only requirement is that by combining an adjustable diaphragm of ferromagnetic material with a magnet, either the diaphragm itself becomes an adjustable and asymmetrically changeable electronic lens, or the pole piece may become an element of magnetic influence by combining the pole piece with the iris diaphragm. By using a large number of diaphragm laminae, a so-called soft adjustment is obtained.

In the accompanying drawings illustrating the invention

Fig. 1 is a schematic view illustrating an electronic optical system including a member for correcting the system.

Fig. 2 shows the arrangement of an iris diaphragm in the air gap of a magnet.

Fig. 3 shows different forms of openings in the iris diaphragm.

Fig. 4 is a side view of an electronic optical mechanism embodying the invention, parts being in section and parts broken away.

Fig. 5 is a front view of the mechanism, partly broken away and partly in section on the rectangularly broken line 5—5 of Fig. 4, one half of the apparatus being shown, the other half being similar.

Figs. 1 and 2 illustrate diagrammatically the principle underlying the invention. In Fig. 1 an electronic optical correction member 3 is supported in position between electronic optical systems 1 and 2. The electronic optically effective portion of the member 3 consists of an iris diaphragm 4. The opening 5 of the diaphragm may be changed symmetrically or asymmetrically and positioned centrally or eccentrically of the optical axis 6—6.

In Figs. 4 and 5 the iris diaphragm consists of a number of laminae 7 which are movably supported on a hollow vessel shaped carrier 8 having a cylindrical side wall 9 and a front plane wall 10. The laminae strips 7 extends along the side wall 9 and are bent to lie across the end wall 10 as shown. A cover 11 suitably secured to the carrier 8 keeps the laminae in their bent formations. They are so placed, supported and operated that their forward ends may be caused to form differently shaped and located iris diaphragm openings with respect to the optical axis 6—6 and as shown in Fig. 3. The mechanism for operating the laminae is as follows, see Figs. 4 and 5.

The cylindrical wall 9 is provided in its circumference with a plurality of circumferentially spaced grooves 14, there being as many grooves as there are laminae. The front wall 10 is provided with a similar number of grooves 15, radially disposed in alinement with the grooves 14. The laminae 7 carry pins having stems 16 which move in the grooves 14 and 15. The pins have heads 17 which move in the grooves 18 in each of two half rings 19 and 20.

The half rings are pivoted upon diametrically opposite located pivots 22 screwed into an annular ring carrier 23 which is slightly curved as shown to permit the rings to be moved about the pivots 22 within the carrier. The latter may be moved axially by an adjustment ring 24 having a flange 25 engaging the carrier ring and a second annular flange 26 engaging a screw ring 27 which engages screwthreads 28 on the outside of the carrier 8 between the grooves 14. The adjustment ring 24 has noses 29 which move in the grooves 14.

It will be seen, therefore, that the ring carrier 23 is adjustable axially by operation of the screw ring. It may also be rotated about the optical axis 6—6 in any adjusted axial position. Within the carrier the two half rings 19 and 20 may be swung or moved about the pivots 22 by taking hold of clamping screws 30 which are screwed into the rings 19 and 20 respectively, and move in slots 31 in the carrier 23 as shown.

The half rings are thus capable of rotary movement about the axis 6—6. They are axially adjustable. They are swingable about the pivots 22, each half ring by itself. These movements are transferred to the pins 16—17 and therefore to the laminae 7 and by any one of these movements or by a combination of these movements, the laminae are actuated to vary the opening, shape and location of the iris diaphragm with respect to the optical axis.

The combination of the described correction mechanism with an electronic optical system may be accomplished by making the laminae carrier 8 into a fixed pole shoe of a magnet and whereby the iris diaphragm 4 and its adjusted opening 5 serve as a continuation of the magnetic pole shoe. The magnet itself may be mounted within the carrier 8, see Fig. 1. If the iris diaphragm is mounted in the air gap of a magnet as diagrammatically shown in Fig. 2, the diaphragm itself becomes the pole shoe of an auxiliary magnet which may be mounted within the main magnet.

By rotating the screw ring 21 by means of handles 40, the carrier 23 is moved axially upon the laminae carrier 8, the lugs 29 moving in the grooves 14 and this movement is communicated to the laminae 7 so that the iris diaphragm circular opening is opened or closed as will be understood. By swinging the half rings 19 and 20 to the same extent on both sides of the pivots 22, the opening is changed from circular to elliptical, Fig. 3, c. By moving the half rings in opposite directions, the diaphragm opening is displaced with respect to the optical axis, Fig. 3, b. An uneven movement of the half rings in opposite directions result in a displaced elliptical opening, Fig. 3, d. By rotating the carrier 23 about the optical axis, the eccentric diaphragm opening moves around the optical axis without changing the form of the opening. An elliptical opening is opened and closed without changing its elliptical form by moving the carrier 23 axially as mentioned above for the circular opening.

We claim:

1. In an electronic correction device for magnetic lenses located in the path of the light rays of the optical system, the improvement comprising a plurality of laminae of ferromagnetic material adapted to form an iris diaphragm, a magnetic carrier having an opening, means for movably supporting said laminae on said carrier and means engaging said carrier and laminae for moving the laminae to form an iris diaphragm of selected size and shape across the opening in the magnetic carrier.

2. In an electronic correction device for magnetic lenses located in the path of the light rays of the optical system, the improvement comprising a plurality of laminae of ferromagnetic material adapted to form an iris diaphragm, a magnetic carrier having an opening in the optical axis of an optical system, means for movably supporting said laminae on said magnetic carrier and means on said carrier engaging said laminae for moving the same to form an iris diaphragm with its opening located in a predetermined optical relation to said optical axis across the opening in the said carrier.

3. The improvement according to claim 2 including means for moving said laminae to form an iris diaphragm with its opening located eccentrically with respect to the said optical axis.

4. The improvement according to claim 2 including means for forming an iris diaphragm having an elliptically shaped opening.

5. In an electronic correction device for magnetic lenses located in the path of the light rays of the optical system, the improvement comprising a plurality of laminae of ferromagnetic material adapted to form an iris diaphragm, a magnetic carrier having an opening in the optical axis of an optical system, an annular member, means for supporting said annular member upon the said carrier in rotatable and axially movable relation, guiding grooves in said carrier and in said annular member, guiding pins in said laminae engaging the said grooves and means for moving said annular member axially and circumferentially upon the said carrier to actuate the said laminae to form the diaphragm.

6. The improvement according to claim 5 in which said annular member consists of two semi-circular members, means for pivotally supporting the said two members upon the said magnetic carrier and means for swingably moving the said two members about their pivotal supports, one member independent of the other member.

7. In an electronic correction device for magnetic lenses located in the path of the light rays of the optical system, the improvement comprising a cylindrical member having an end wall at one end thereof with a centrally disposed opening therein, said member being a magnet with its central axis coinciding with the optical axis of an optical system, a plurality of parallel spaced grooves on the outside of said cylindrical member, a like number of radially disposed grooves in the said end wall extending from the axis of the cylinder and in operative alinement with the said outside grooves, a plurality of laminae of ferromagnetic material adapted to form an iris diaphragm, guiding pins in each of said laminae, means for movably supporting said laminae upon the said cylinder with the said laminae guiding pins moving in the said parallel and radial grooves and means carried upon the cylinder and operatively engaging the said laminae to move the same to form an iris diaphragm across the said end wall opening.

GUSTAV WEISSENBERG.
OTTO SÄNGER.

REFERENCES CITED

The following references are of record in the file of this patent:

UNITED STATES PATENTS

| Number | Name | Date |
|---|---|---|
| 2,330,628 | Ruska | Sept. 28, 1943 |
| 2,356,535 | Ruska | Aug. 22, 1944 |
| 2,418,228 | Hillier | Apr. 1, 1947 |
| 2,418,349 | Hillier et al. | Apr. 1, 1947 |
| 2,455,676 | Hillier | Dec. 7, 1948 |
| 2,469,165 | Hillier | May 3, 1949 |